United States Patent
Juilliart et al.

(10) Patent No.: US 9,380,098 B2
(45) Date of Patent: Jun. 28, 2016

(54) METHOD FOR TRANSMITTING A VIDEO STREAM

(71) Applicant: Alcatel Lucent, Boulogne Billancourt (FR)

(72) Inventors: Nathalie Juilliart, Acigne (FR); Marin Osmond, Acigne (FR)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 14/442,834

(22) PCT Filed: Nov. 18, 2013

(86) PCT No.: PCT/EP2013/074023
§ 371 (c)(1),
(2) Date: May 14, 2015

(87) PCT Pub. No.: WO2014/079793
PCT Pub. Date: May 30, 2014

(65) Prior Publication Data
US 2015/0334156 A1 Nov. 19, 2015

(30) Foreign Application Priority Data

Nov. 20, 2012 (EP) .................................. 12306443

(51) Int. Cl.
*H04N 7/15* (2006.01)
*H04L 29/06* (2006.01)
(Continued)

(52) U.S. Cl.
CPC ............ *H04L 65/605* (2013.01); *H04L 65/607* (2013.01); *H04L 65/80* (2013.01);
(Continued)

(58) Field of Classification Search
CPC ................ H04N 21/23418; H04N 21/234345; H04N 21/812; H04N 7/141; H04N 7/15; H04L 65/607; H04L 65/80; H04L 65/605
USPC ............................ 348/14.01–14.16; 715/753; 370/260–261; 709/204
See application file for complete search history.

(56) References Cited

U.S. PATENT DOCUMENTS

2004/0116183 A1* 6/2004 Prindle .................... A63F 13/12
463/42
2007/0288651 A1 12/2007 Nassor et al.

FOREIGN PATENT DOCUMENTS

| FR | 2 902 266 A1 | 12/2007 |
| FR | 2 943 879 A1 | 10/2010 |
| WO | WO 2008/054926 A1 | 5/2008 |

OTHER PUBLICATIONS

Clark N. Taylor et al., "ORBit: An Adaptive Data Shaping Technique for Robust Wireless Video Clip Communication," Conference Record of the 37th Asilomar Conference on Signals, Systems, & Computers, IEEE, vol. 2, pp. 1567-1571, XP010702502, Nov. 9, 2003.

(Continued)

*Primary Examiner* — Melur Ramakrishnaiah
(74) *Attorney, Agent, or Firm* — Fay Sharpe, LLP

(57) ABSTRACT

Method for transmitting a video stream in a network (5), said method being performed by a video transmission device (3) and comprising:—receiving a first video stream ($V_{IN}$) from a source communication terminal (2),—determining a quality level (Q) of said first video stream ($V_{IN}$), and—transmitting a second video stream ($V_{OUT}$) based on said first video stream ($V_{IN}$) to a destination communication terminal (4), wherein:—if said quality level (Q) is above a predetermined threshold, a frame of the second video stream ($V_{OUT}$) includes a frame of said first video stream ($V_{IN}$), and—if said quality level (Q) is below said predetermined threshold, the method comprises determining a portion of a frame of said first video stream ($V_{IN}$) which meets a quality criteria, a frame of the second video stream ($V_{OUT}$) including said portion and a frame of a third video stream ($V_{SUB}$).

12 Claims, 5 Drawing Sheets

(51) Int. Cl.
  *H04N 7/14* (2006.01)
  *H04N 21/234* (2011.01)
  *H04N 21/2343* (2011.01)
  *H04N 21/81* (2011.01)

(52) U.S. Cl.
  CPC ............... *H04N 7/141* (2013.01); *H04N 7/15* (2013.01); *H04N 21/23418* (2013.01); *H04N 21/234345* (2013.01); *H04N 21/812* (2013.01)

(56) References Cited

OTHER PUBLICATIONS

"Speech and multimedia Transmission Quality (STQ); Audiovisual QoS for communication over IP networks," European Telecommunications Standards Institute, ETSI ES 202 667 V1.1.3, pp. 1-69, XP014052857, Jan. 7, 2010.

International Search Report for PCT/EP2013/074023 dated Dec. 13, 2013.

* cited by examiner

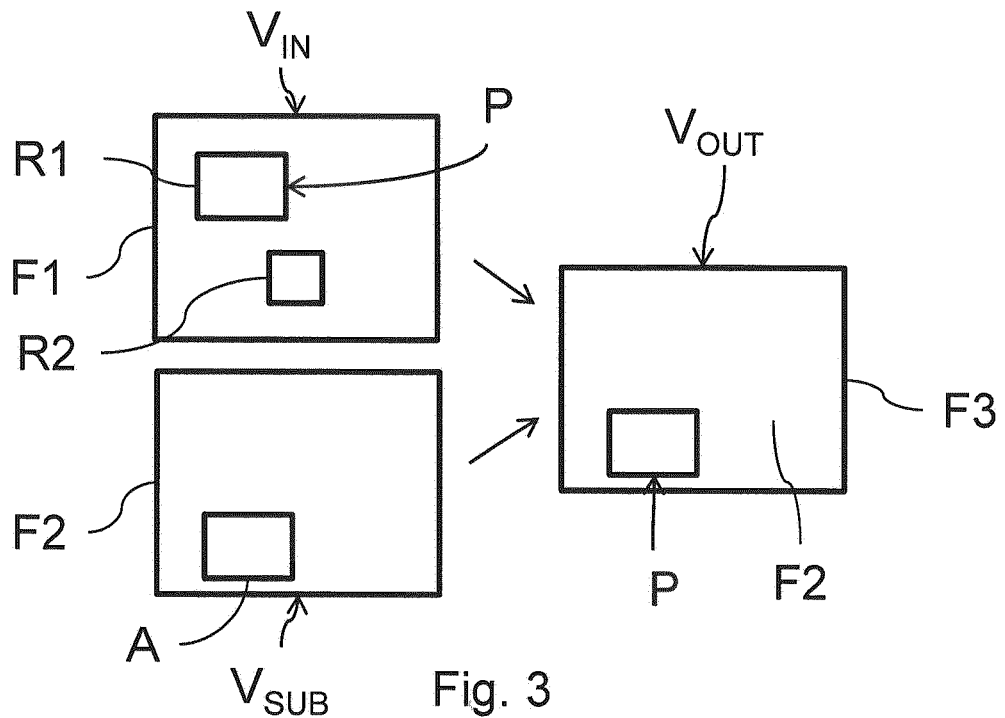
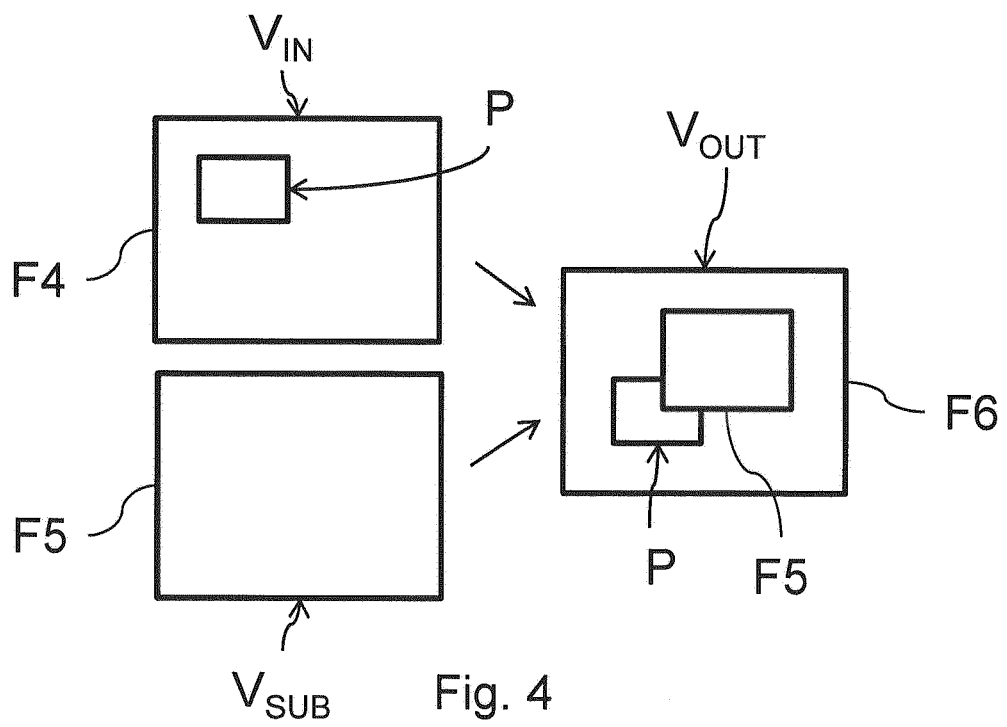

METHOD FOR TRANSMITTING A VIDEO STREAM

FIELD OF THE INVENTION

The present invention relates to the field of transmission of video streams in a network.

BACKGROUND

When transmitting a video stream in a network, several technical solutions are known to ensure a level of quality or react when the expected level is no longer guaranteed. For example, in an IP Multimedia Subsystem (IMS) or LTE network, during call setup, codecs are negotiated (SDP negotiation) to obtain an agreement between end users and the network. Within Media Server (MRF Network Element, Media Resource Function of IMS) or in end user terminal themselves, some synchronization mechanisms, predictive or corrective algorithms are known that can be used for maintaining a desired level of quality. Examples are audio and video synchronisation using real time control protocol (RTCP) and packet loss concealment (PLC). However, these various technical solutions are limited by the physical capacity of the network.

In case the quality of a video stream is insufficient, a possible reaction is to cancel transmission of the video stream (and transmitting only audio) or replacing the video stream with a predetermined video stream, for example an avatar. However, in that case, the user has no information about the video stream.

SUMMARY

It is thus an object of embodiments of the present invention to propose an improved method for transmitting a video stream in a network, which does not show the inherent shortcomings of the prior art methods.

According to embodiments of the present invention this object is achieved by a method for transmitting a video stream in a network, said method being performed by a video transmission device and comprising:
  receiving a first video stream from a source communication terminal,
  determining a quality level of said first video stream, and
  transmitting a second video stream based on said first video stream to a destination communication terminal, wherein:
  if said quality level is above a predetermined threshold, a frame of the second video stream includes a frame of said first video stream, and
  if said quality level is below said predetermined threshold, the method comprises determining a portion of a frame of said first video stream which meets a quality criteria, a frame of the second video stream including said portion and a frame of a third video stream.

Correspondingly, embodiments of the invention relates to a video transmission device comprising:
  means for receiving a first video stream from a source communication terminal,
  means for determining a quality level of said first video stream, and
  means for transmitting a second video stream based on said first video stream to a destination communication terminal, and
  means for determining a portion of a frame of said first video stream which meets a quality criteria, activated if said quality level is below said predetermined threshold, wherein
  if said quality level is above a predetermined threshold, a frame of the second video stream includes a frame of said first video stream, and
  if said quality level is below said predetermined threshold, a frame of the second video stream includes said portion and a frame of a third video stream.

In this way, when quality is sufficient, the first video stream may be transmitted to the destination communication terminal without modification. In contrast, when quality is not sufficient, only a portion of the first video stream is transmitted to the destination communication terminal, in combination with a substitute video stream. Since the selected portion meets quality criteria, the quality degradation may be (at least partially) hidden to the user of the destination communication terminal. Moreover, since a substitute video stream is provided to the user, the user's attention can be diverted from the reduced size of portion P with respect to the original video. Consequently, the user may enjoy a fluid a satisfying viewing experience even when quality is degraded.

In an embodiment, the first video stream comprises first image data which contain data of a complete region of a frame and second image data which contain data on the changes of a region of a frame with respect to a previous frame, said quality criteria being met by a region if second image data have been received for said region for a predetermined duration.

If said quality level is below said predetermined threshold, said frame of the second video stream may include said portion at a location specified by metadata of the third video stream.

If said quality level is below said predetermined threshold, said frame of the second video stream may include said portion at a location determined by analysis of the third video stream.

If said quality level is below said predetermined threshold, said frame of the second video stream includes said portion at a predetermined location.

In the three above-mentioned examples, the portion may be located at an area of least interest.

The third video stream may include advertisement.

In an embodiment, the third video stream may be determined in function of an identifier of the source communication terminal or of the destination communication terminal. Accordingly, personalization is provided.

For example, the third video stream may be determined in function of data related to said identifier available from a social network service.

In an embodiment, determining a portion of a frame of said first video stream which meets a quality criteria is repeated for successive frames of said first video stream. Accordingly, the determined portion may vary over time for successive frames.

Embodiments relates to videoconferencing. Accordingly, the method may comprise:
  receiving a plurality of first video streams from respective communication terminals,
  determining a quality level for at least one of said first video streams,
  transmitting a second video stream based on said first video streams to said communication terminals, wherein:
  if said quality level is above a predetermined threshold, a frame of the second video stream includes a frame of said at least one of said first video streams, and if said quality level is below said predetermined threshold, the method comprises determining a portion of a frame of said at least one first video stream which meets a quality criteria, a frame of the second video stream including said portion and a frame of a third video stream.

For example, the second video stream may be a mosaic based on said first video streams. In another embodiment, the second video stream may be determined by selecting one of the first video streams, for example the one wherein the participant speaks the loudest.

Embodiments of the invention also relates to a computer program, for example on a computer readable-medium, including instructions for executing a method according to an embodiment of the invention when said program is executed by a computer.

BRIEF DESCRIPTION OF THE DRAWINGS

The above and other objects and features of the invention will become more apparent and the invention itself will be best understood by referring to the following description of embodiments taken in conjunction with the accompanying drawings wherein:

FIGS. 3, 4 and 5 illustrate various example of the combination of a portion of a video stream with a substitute video stream.

DESCRIPTION OF EMBODIMENTS

It is to be remarked that the functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

It should be further appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Figure 1:
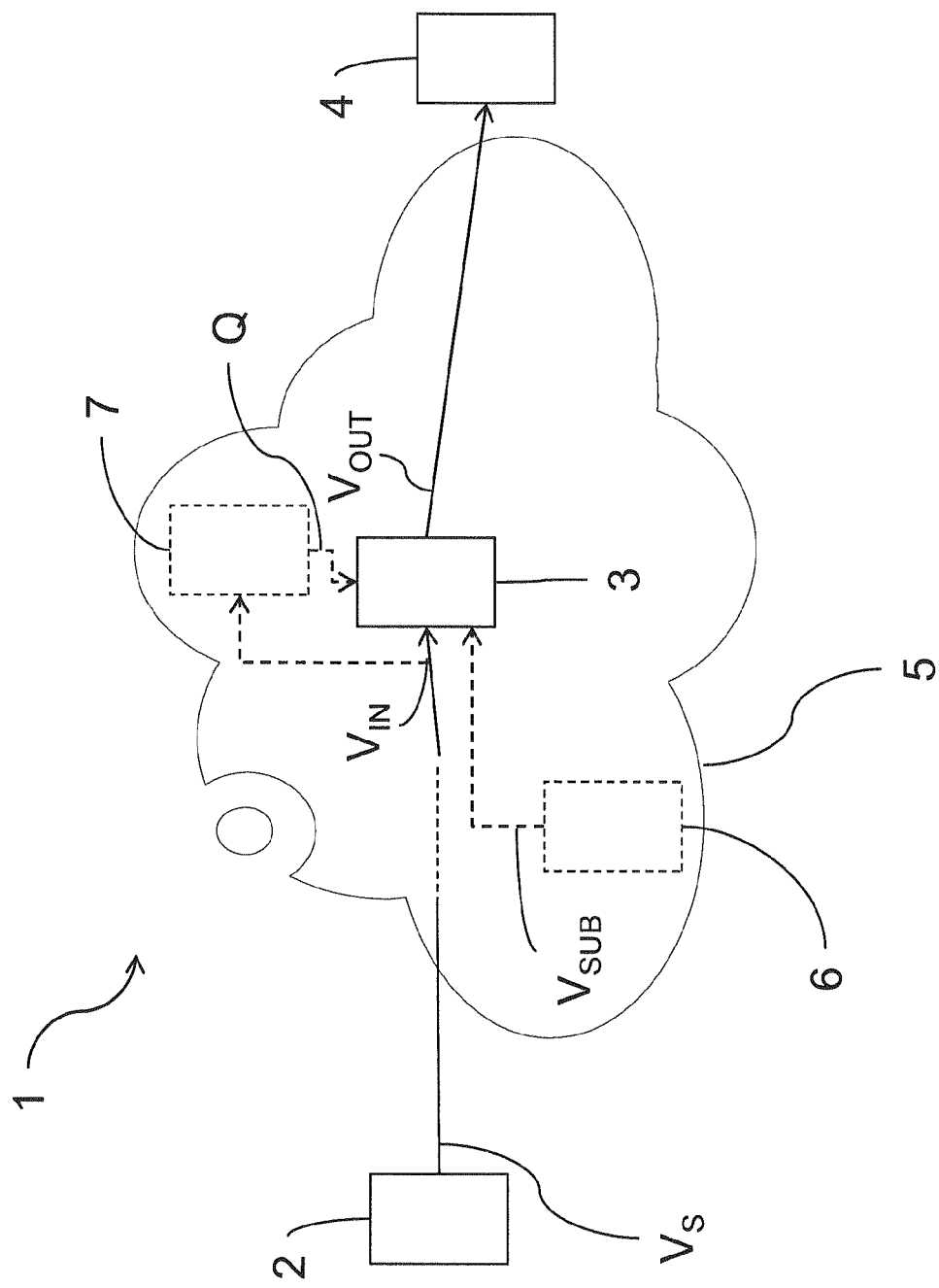
FIG. 1 is a schematic of a system wherein a method for transmitting a video stream according to an embodiment of the invention may be implemented.

FIG. 1 is a schematic of a system 1 wherein a method for transmitting a video stream according to an embodiment of the invention may be implemented. The system 1 comprises a communication terminal 2, a video transmission device 3 and a communication terminal 4, connected by a network 5. The system 1 may also comprises a substitute video server 6 and a video quality assessment device 7.

The system 1 allows transmitting a source video stream $V_S$ from the communication terminal 2 (which acts as a source terminal) to the communication terminal 4 (which acts as destination terminal), through the network 5, via the video transmission device 3. The transmission of the video stream $V_S$ may be initiated in an IP Multimedia Subsystem, using the Session Initiation Protocol (SIP). However, embodiments of the invention are not limited to this example.

The communication terminal 2 may be a multimedia server storing a plurality of video streams which may be requested by users. The communication terminal 2 may also be a user terminal, for example a terminal capable of acquiring video and emitting the acquired video through the network for video communication such as a PC or a Smartphone.

The communication terminal 4 may be a user terminal capable of receiving a video stream to be displayed, for example a PC, a Smartphone, a Set Top Box . . .

The video transmission device 3 is located in the network 5 between the communication terminal 2 and the communication terminal 4. The video stream $V_{IN}$ received by the video transmission device 3 may differ from the source video stream $V_S$, for example due to packet loss or delay in the network 5. In other words, the video stream $V_{IN}$ available in the network 5 may be distorted, that is quality may be reduced.

In order to take the possible quality degradation into account, the video transmission device 3 determines a quality level Q of the video stream $V_{IN}$. In an embodiment, the video transmission device 3 assesses the quality level Q itself. In another embodiment, show by dashed line on FIG. 1, the video transmission device 3 determines the quality level Q by consulting a video quality assessment device 7 configured for assessing the quality of the video stream $V_{IN}$ and for providing the quality level Q to the video transmission device 3.

The quality level Q may be assessed by any suitable video quality assessment method. In an embodiment wherein the source video stream $V_S$ is encoded based on I-Slices (which contain data of a complete region of a frame) and P-Slices (which contain data on the changes of a region of a frame with respect to a previous frame), the quality level Q may reflect a sufficient quality if P-Slices have been received for each region of a frame for a predetermined duration, and may reflect an insufficient quality otherwise.

The video stream $V_{OUT}$ transmitted from the video transmission device 3 to the communication terminal 4 depends on the determined quality level Q:

If the quality level Q is above a predetermined quality threshold $Q_0$, video stream $V_{OUT}$ comprises the video stream $V_{IN}$ in its entirety (for example the video stream $V_{OUT}$ is equal to the video stream $V_{IN}$).

If the quality level Q is below the quality threshold $Q_0$, the video transmission device 3 compose the video stream $V_{OUT}$ by combining a portion of the video stream $V_{IN}$ which meets a quality criteria and a substitute video stream $V_{SUB}$. Several possibilities for this combination will be described hereafter with reference to FIGS. 3, 4 and 5.

The substitute video stream $V_{SUB}$ may be a video stored in the video transmission device 3. In another embodiment, show by dashed line on FIG. 1, the substitute video stream $V_{SUB}$ is provided to the video transmission device 3 by a substitute video server 6.

The substitute video stream $V_{SUB}$ may contain an advertisement. It may depend on an ID of the user of communication terminal 2 or communication terminal 4. For example, the substitute video server 6 selects an advertisement based on profile information indicating that the selected advertisement is suitable for the user. The substitute video stream $V_{SUB}$ may also contain a video preselected by the user of communication terminal 2 or communication terminal 4, in a similar manner to the application to video of a Personal Ring Back Tone function. The substitute video stream $V_{SUB}$ may also contain a video determined based on data related to the user of communication terminal 2 or 4, available from a social network service. For example, if the user of communication terminal 2 has shared a video on a social network service, this video may be included in the substitute video stream $V_{SUB}$.

Figure 2:
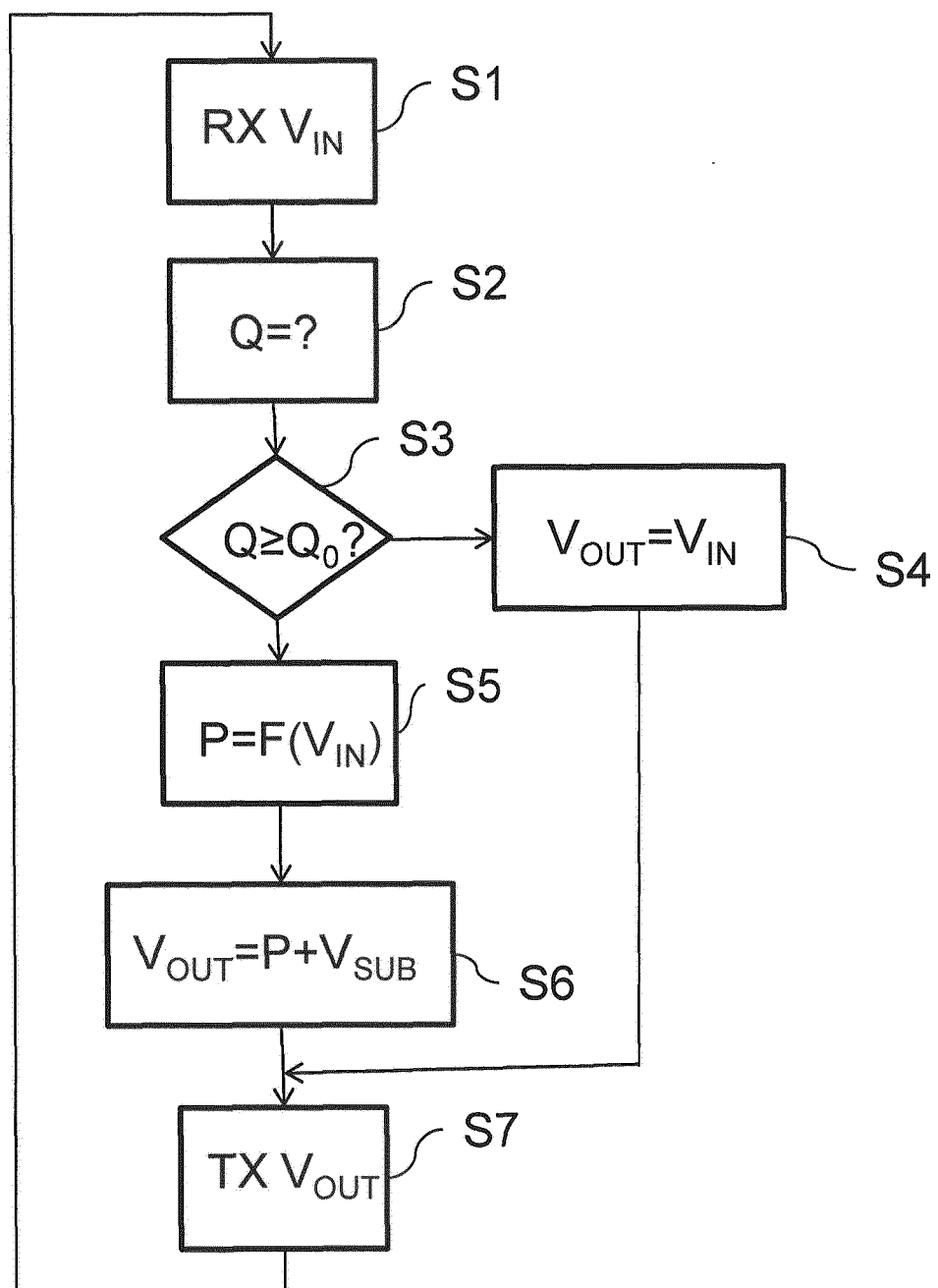
FIG. 2 is a flowchart of a method for transmitting a video stream according to an embodiment of the invention.

FIG. 2 is a flow chart of a method for transmitting a video stream, performed by the video transmission device 3.

The video transmission device 3 receives the video stream $V_{IN}$ from the communication terminal 2 (Step S1), and determines the quality level Q of video stream $V_{IN}$ (Step S2). The determined quality level Q is compared with threshold $Q_0$ (Step S3).

If $Q>Q_0$ (or $Q\geq Q_0$), then the video transmission device 3 uses as output video stream $V_{OUT}$ the video stream $V_{IN}$ (Step S4).

In contrast, if $Q<Q_0$ (or $Q\leq Q_0$), then the video transmission device 3 determines at least a portion P of the video stream $V_{IN}$ which meets a quality criteria (Step S5) and compose the video stream $V_{OUT}$ by combining the portion P with the substitute video stream $V_{SUB}$ (Step S6).

In both cases, the video stream $V_{OUT}$ is transmitted to the communication terminal 4 (Step S7).

As shown by the arrow from step S7 to step S1 on FIG. 2, the steps S1 to S7 are continuously performed while transmitting the video stream. Consequently, the transmission of the whole video stream may be composed of time periods wherein quality of $V_{IN}$ is satisfying ($Q\geq Q_0$) and $V_{OUT}$ is equal to $V_{IN}$ and other time periods wherein quality of $V_{IN}$ is not satisfying ($Q<Q_0$) and $V_{OUT}$ is the result of the combination of a portion of $V_{IN}$ with the substitute video stream $V_{SUB}$.

When the source video stream $V_S$ is encoded based on I-Slices (which contain data of a complete region of a frame) and P-Slices (which contain data on the changes of a region of a frame with respect to a previous frame), the quality criteria used for determining a portion P of the video stream $V_{IN}$ may be as follows: A region of a frame is selected as a portion P which meets the quality criteria if at one time T, P-Slices about this region have been received regularly since a number of milliseconds configurable and inferior to the time interval between two complete images (I-SLICE). In case P-Slices have been received for several regions, the largest region may be selected. Of course, other quality criteria may be used.

FIG. 3 illustrates a first example of composing the video stream $V_{OUT}$ by combining a portion of video stream $V_{IN}$ with the substitute video stream $V_{SUB}$. FIG. 3 shows a frame F1 of video stream $V_{IN}$ where two regions R1 and R2 meet the quality criteria. The largest one (R1 in this example) is selected as portion P to be included in video stream $V_{OUT}$. FIG. 3 shows a frame F2 of substitute video stream $V_{SUB}$ which contains an area A of least interest. Area A may be specified for example by metadata included in substitute video stream $V_{SUB}$. In another example, area A may be determined by the video transmission device 3 by analyzing the substitute video stream $V_{SUB}$, for example based on movement vectors of the video stream $V_{IN}$. Finally, FIG. 3 shows a frame F3 of video stream $V_{OUT}$ composed by superposing the portion P of frame F1 on frame F2, at the location of area A. In case area A and portion P do not have the same size, this may involve increasing or reducing the size of portion P.

This combination is repeated for successive frames. The portion P may be determined individually for each frame. Thus, the portion P of video stream $V_{IN}$ included in video stream $V_{OUT}$ may vary over time. For example, if P-Slices cease to be received for region R1 but not for region R2, region R2 may be selected instead of region R1 as portion P and included in video stream $V_{OUT}$.

FIG. 4 illustrates a second example of composing the video stream $V_{OUT}$ by combining a portion of video stream $V_{IN}$ with the substitute video stream $V_{SUB}$. FIG. 4 shows a frame F4 of video stream $V_{IN}$ with the portion P selected to be included in video stream $V_{OUT}$. FIG. 4 shows a frame F5 of substitute video stream $V_{SUB}$. Finally, FIG. 4 shows a frame F6 of video stream $V_{OUT}$ composed by adding the portion P of frame F4 and frame F5 on a background, for example a black background. In this example, portion P and frame F5 overlap partially in frame F6, but they may be adjacent without overlapping. Depending on the relative size of frames F5 and F6, the size of frame F5 may be reduced to fit in frame F6 while leaving sufficient space for portion P.

Figure 5:
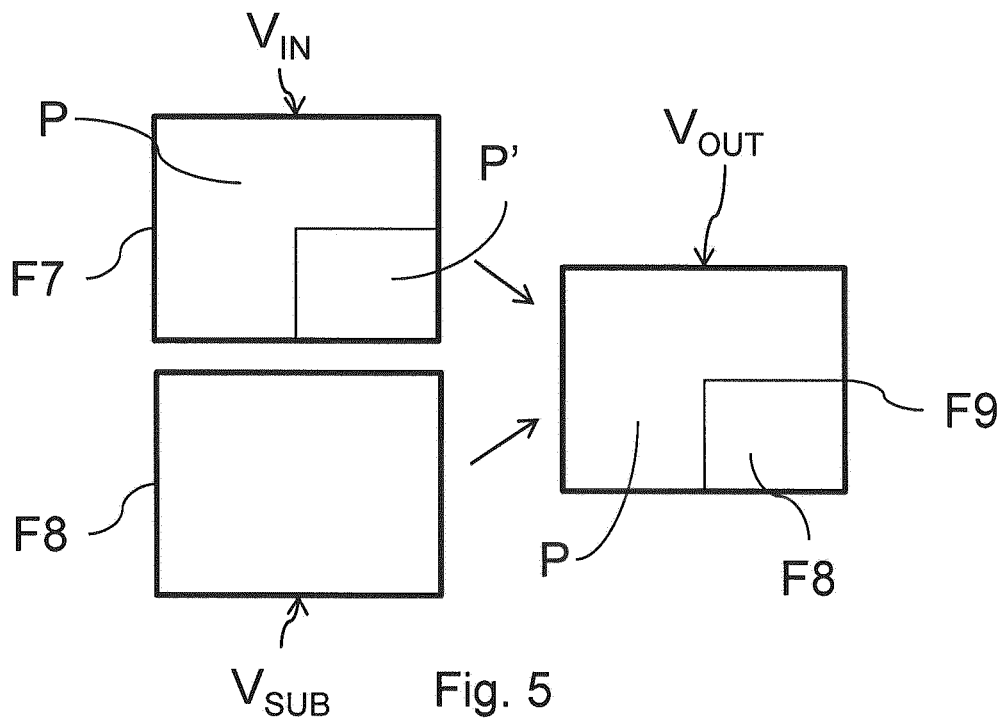

FIG. 5 illustrates a third example of composing the video stream $V_{OUT}$ by combining a portion of video stream $V_{IN}$ with the substitute video stream $V_{SUB}$. FIG. 5 shows a frame F7 of video stream $V_{IN}$ with the portion P selected to be included in video stream $V_{OUT}$. In this case, portion P covers most of the frame F7 with the exception of non-selected portion P'. FIG. 5 shows a frame F8 of substitute video stream $V_{SUB}$. Finally, FIG. 5 shows a frame F9 of video stream $V_{OUT}$ composed by replacing the non-selected portion P' of frame F7 by frame F8. Depending on the relative size of non-selected portion P' and frame F8, the size of frame F8 may be increased or reduced to fit over the non-selected portion P'.

Each of the examples of FIGS. 3 to 5 has been described with reference to individual frames. It should be understood that successive frames of the video stream $V_{OUT}$ are composed in a similar manner while the quality of video stream $V_{IN}$ is degraded ($Q<Q_0$).

In the system 1, when quality is sufficient ($Q>Q_0$), video stream $V_{IN}$ is transmitted to the user terminal 4 without modification. In contrast, when quality is not sufficient ($Q<Q_0$), only a portion of the video stream $V_{IN}$ is transmitted to the communication terminal 4, in combination with a substitute video stream $V_{SUB}$. Since the selected portion meets quality criteria, the quality degradation may be (at least partially) hidden to the user of communication terminal 4. Moreover, since a substitute video stream is provided to the user, the user's attention can be diverted from the reduced size of portion P with respect to the original video. Consequently, the user of communication terminal 4 may enjoy a fluid a satisfying viewing experience even when quality is degraded.

So far, the transmission of a video stream from communication terminal 2 to communication terminal 4 has been described. In case both communication terminals 2 and 4 are user terminal capable transmitting and receiving a video stream, for example for a 2-ways video conversation, the video transmission device 3 may apply the same method as described above to the video stream received from the communication terminal 4 in order to determine the video stream to be transmitted to the communication terminal 2.

Figure 6:
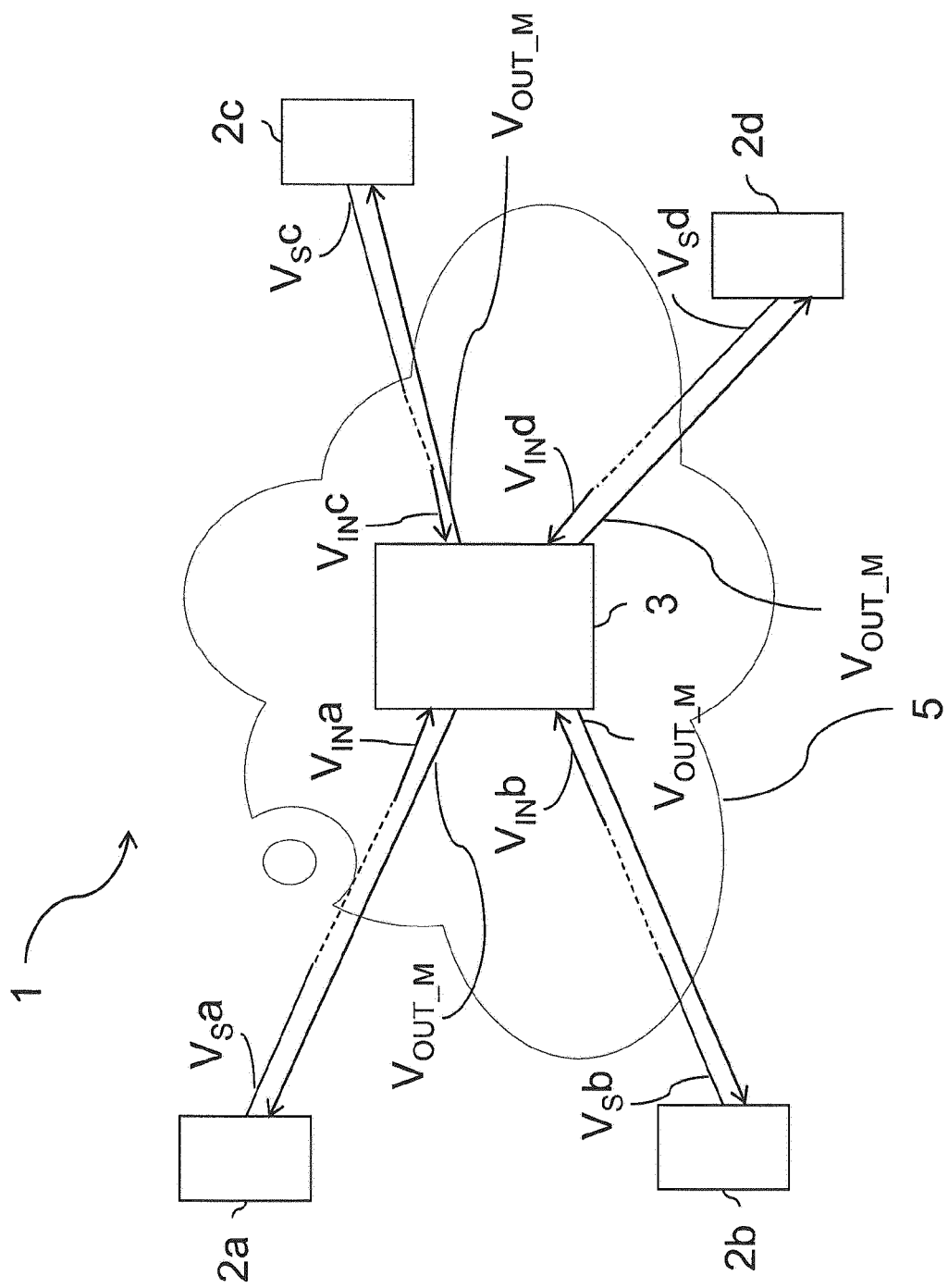
FIG. 6 is a schematic of a system wherein a method for transmitting a video stream according to an embodiment of the invention may be implemented, and, FIG. 7 illustrates an example of the combination of a portion of a video stream with a substitute video stream, in the system of FIG. 6.

The system 1 of FIG. 1 has been described with reference to a communication between two communication terminals. However, embodiments of the invention also apply to a communication between a plurality (i.e. more than 2) of communication terminals, as illustrated in FIG. 6. In FIG. 6, the same references as in FIG. 1 designate the same or similar components.

The system 1 of FIG. 6 comprises a plurality of communication terminals 2a, 2b, 2c, 2d, connected through a network 5 via a video transmission device 3.

Each communication terminal 2a, 2b, 2c, 2d sends a respective source video stream $V_S a$, $V_S b$, $V_S c$, $V_S d$ to the video transmission device 3. Due for example to packet loss and delays in the network 5, the videos streams $V_{IN}a$, $V_{IN}b$, $V_{IN}c$, $V_{IN}d$ received by the video transmission device 3 may differ from the source video stream $V_S a$, $V_S b$, $V_S c$, $V_S d$, in other words quality may be degraded.

The video transmission device 3 acts as a video conference server and transmits a video stream $V_{OUT\_M}$ to each communication terminal 2a, 2b, 2c, 2d.

In one embodiment, the video stream $V_{OUT\_M}$ is determined by selecting one of the videos streams $V_{IN}a$, $V_{IN}b$, $V_{IN}c$, $V_{IN}d$, for example based on which participant speaks the loudest, and applying the method of FIG. 2 to the selected video stream.

In the embodiment of FIG. 6, the video transmission device 3 transmit the same video stream $V_{OUT\_M}$ to each communication terminal 2a, 2b, 2c, 2d. However, in another embodiment, different video streams may be transmitted to each communication terminal 2a, 2b, 2c, 2d.

Figure 7:
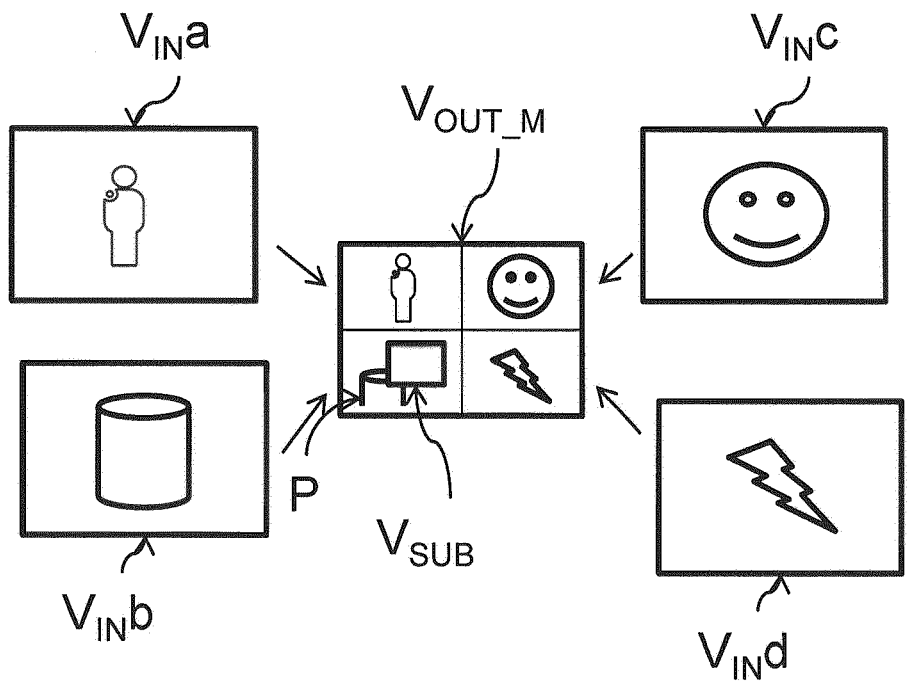

In another embodiment, which is illustrated on FIG. 7, the video stream $V_{OUT\_M}$ is determined by applying the method of FIG. 2 to at least one of the videos streams $V_{IN}a$, $V_{IN}b$, $V_{IN}c$, $V_{IN}d$, and then by composing a mosaic of the resulting video streams. Preferably, the method of FIG. 2 is applied in parallel to each one of the videos streams $V_{IN}a$, $V_{IN}b$, $V_{IN}c$, $V_{IN}d$. Thus, in the example of FIG. 7, the quality level of video streams $V_{IN}a$, $V_{IN}c$ and $V_{IN}d$, was judged sufficient, whereas the quality level of video stream $V_{IN}b$ was judged insufficient. Consequently, the mosaic of video stream $V_{OUT\_M}$ includes entire frames of each of video streams $V_{IN}a$, $V_{IN}c$ and $V_{IN}d$, and a portion of a frame of video stream $V_{IN}b$ combined with a frame of a substitute video stream. This combination may be performed for example as described above with reference to one of FIGS. 3 to 5.

Embodiments of the method can be performed by means of dedicated hardware and/of software or any combination of both.

While the principles of the invention have been described above in connection with specific apparatus, it is to be clearly understood that this description is made only by way of example and not as a limitation on the scope of the invention, as defined in the appended claims.

The invention claimed is:

1. Method for transmitting a video stream in a network, said method being performed by a video transmission device and comprising:
   receiving a first video stream from a source communication terminal,
   determining a quality level of said first video stream, and
   transmitting a second video stream based on said first video stream to a destination communication terminal, wherein:
   if said quality level is above a predetermined threshold, a frame of the second video stream includes a frame of said first video stream, and
   if said quality level is below said predetermined threshold, the method comprises determining a portion of a frame of said first video stream which meets a quality criteria, a frame of the second video stream including said portion and a frame of a third video stream.

2. Method according to claim 1, wherein said first video stream comprises first image data which contain data of a complete region of a frame and second image data which contain data on the changes of a region of a frame with respect to a previous frame, said quality criteria being met by a region if second image data have been received for said region for a predetermined duration.

3. Method according to claim 1 wherein, if said quality level is below said predetermined threshold, said frame of the second video stream includes said portion at a location specified by metadata of the third video stream.

4. Method according to claim 1 wherein, if said quality level is below said predetermined threshold, said frame of the second video stream includes said portion at a location determined by analysis of the third video stream.

5. Method according to claim 1 wherein, if said quality level is below said predetermined threshold said frame of the second video stream includes said portion at a predetermined location.

6. Method according to claim 1, wherein the third video stream is determined in function of an identifier of the source communication terminal or of the destination communication terminal.

7. Method according to claim 6, wherein the third video stream is determined in function of data related to said identifier available from a social network service.

8. Method according to claim 1, wherein determining a portion of a frame of said first video stream which meets a quality criteria is repeated for successive frames of said first video stream.

9. Method according to claim 1, comprising:
   receiving a plurality of first video streams from respective communication terminals,
   determining a quality level for at least one of said first video streams,
   transmitting a second video stream based on said first video streams to said communication terminals, wherein:
   if said quality level is above a predetermined threshold, a frame of the second video stream includes a frame of said at least one of said first video streams, and
   if said quality level is below said predetermined threshold, the method comprises determining a portion of a frame of said at least one first video stream which meets a quality criteria, a frame of the second video stream including said portion and a frame of a third video stream.

10. Method according to claim 9, wherein the second video stream is a mosaic based on said first video streams.

11. Computer program including instructions for executing the method according to claim 1 when said program is executed by a computer.

12. Video transmission device comprising:
   means for receiving a first video stream from a source communication terminal,
   means for determining a quality level of said first video stream, and
   means for transmitting a second video stream based on said first video stream to a destination communication terminal, and means for determining a portion of a frame of said first video stream which meets a quality criteria, activated if said quality level is below said predetermined threshold, wherein if said quality level is above a predetermined threshold, a frame of the second video stream includes a frame of said first video stream, and if said quality level is below said predetermined threshold, a frame of the second video stream includes said portion and a frame of a third video stream.

* * * * *